United States Patent [19]

Hong

[11] Patent Number: 5,396,538
[45] Date of Patent: Mar. 7, 1995

[54] CONTACTLESS DIGITAL POWER TRANSMISSION AND RECEPTION SYSTEM IN A RADIO TELEPHONE

[75] Inventor: Chung-Sik Hong, Suwon, Rep. of Korea

[73] Assignee: SamSung Electronics Co., Ltd., Suwon, Rep. of Korea

[21] Appl. No.: 812,812

[22] Filed: Dec. 24, 1991

[30] Foreign Application Priority Data

Oct. 25, 1991 [KR] Rep. of Korea .......... 1991-18829 U

[51] Int. Cl.⁶ .......................................... H04M 11/00
[52] U.S. Cl. ........................................ 379/58; 379/55; 379/61
[58] Field of Search ............... 379/55, 58, 61; 455/41; 381/79

[56] References Cited

U.S. PATENT DOCUMENTS

| | | | |
|---|---|---|---|
| 3,919,491 | 11/1975 | Luce | 379/61 |
| 4,550,444 | 10/1985 | Uebel | 455/41 |
| 4,669,109 | 5/1987 | L eCheviller et al. | 379/58 |
| 4,811,421 | 3/1989 | Havel | 379/58 |
| 5,070,500 | 12/1991 | Horinouchi et al. | 455/41 |

FOREIGN PATENT DOCUMENTS

| | | | |
|---|---|---|---|
| 0115045 | 9/1981 | Japan | 379/55 |
| 2202414 | 9/1988 | United Kingdom | 379/55 |

*Primary Examiner*—Curtis Kuntz
*Assistant Examiner*—Dwayne D. Bost
*Attorney, Agent, or Firm*—Robert E. Bushnell

[57] ABSTRACT

A contactless charging system of a radio telephone comprising a portable device and a base unit, for charging a battery of the portable device, without electrical contact, by induction voltage of an electromagnetic field formed by the inductive coupling of a digital power receiver of the portable device and a digital power transmitter of the base unit, when the portable device is placed in the base unit.

43 Claims, 5 Drawing Sheets

CONTACTLESS DIGITAL POWER TRANSMISSION AND RECEPTION SYSTEM IN A RADIO TELEPHONE

FIELD OF THE INVENTION

This invention relates to a radio telephone system, and more particularly to a contactless digital power transmission and reception system that charges a battery and performs data transmission and reception without substantial contact between a charger of a base unit and a portable device in a radio telephone.

TECHNICAL BACKGROUND OF THE INVENTION

According to a communication industry development, speech communication has gradually developed from a wire terminal communication system connected to a wire communication channel to a radio terminal communication system using a radio telephone.

Generally the radio telephone is classified as either a portable radio telephone utilizing a radio channel or a cordless phone replacing a cord between a base unit and a hand-set of a telephone with a radio channel.

The radio telephone and cordless phone use a rechargeable battery for operating an internal electronic and electrical circuit because a user carries a portable device for speech communication. Accordingly the battery of the portable device should be charged if a voltage of the battery is dropped below a given level of voltage. The battery of the portable device of the radio telephone is generally charged by a charger. A charging function of the radio telephone is performed by mechanically contacting a voltage output end of the charger with a charging end of the portable device for conducting electrical energy. For example, a battery of the portable device is charged by contacting a conductive voltage pad of the battery with an output end of a terminal spring of a charger.

The conductive voltage pad of the battery and the output end of the charger, however, are made of a conductive metal, so that such mechanical contact is not proper for charging the battery efficiently because the conductive metal is apt to be oxidized easily and an alien substance is apt to adhere to the voltage pad of the battery and the output end of the charger.

The cordless phone having a base unit and a portable device transmits and receives data representing an identification code (ID code) therebetween and a state of communication at a given period or at a time of occurrence of a corresponding event is performed. Data communication is performed between the base unit and the portable device by a radio frequency transmitter and receiver while the portable device is separated from the base unit. When the portable device is placed on the base unit, data communication is performed between the two through another communication terminal, after cutting off power to the radio frequency transmitter and receiver in order to save the battery's energy.

Both the base unit and the portable device have a data communication terminal made of a good conductive metal pad, and data communication is performed during a state of mechanical contact when the base unit and portable device are coupled to each other.

However, in the case of either communication terminal being oxidized and/or contaminated with an alien substance, it is impossible for a conventional radio telephone to perform data communication because of bad electrical contact. Further, because the conventional radio telephone has only communication terminal between the base unit and the portable device, data transmission speed is slow due to the fact that full duplex communication is impossible.

SUMMARY OF THE INVENTION

Accordingly, an object of this invention is to provide a system for charging a battery of a portable device without having a mechanical contact between a portable device and a base unit of a radio telephone.

Another object of this invention is to provide a charging system for transmitting a voltage to a battery by inductively coupling a charger with a portable device.

Still another object of this invention is to provide a communication system for transmitting and receiving data between the portable device and the base unit as well as transmitting a voltage from the base unit to the portable device without a mechanical contact in a radio telephone system.

According to an aspect of the present invention, both a portable device and a charger of a base unit include a voltage converter for switching a given level of DC voltage into an AC voltage corresponding to a data control pulse input of "0" state or "1" state and an induction data voltage generator for generating an induction voltage of an electromagnetic field corresponding to the AC voltage of the voltage converter.

The portable device has a digital power receiver detecting and rectifying an induction voltage of an electromagnetic field from the induction data voltage generator of the charger into a DC voltage of a given level, and for generating binary data of either a "0" or "1" state by detecting a level of the rectified voltage, the rectified voltage output being transmitted to the battery of the portable device.

The charger of the base unit has a data receiver for detecting and rectifying an induction voltage of an electromagnetic field from the induction data voltage generator of the portable device, and for transmitting binary data of "0" or "1" state according to a level of the rectified voltage.

When the portable device is placed on the charger, the digital power receiver of the portable device is coupled with the induction voltage of the electromagnetic field formed by the induction data voltage generator of the charger of the base unit responding to a binary data control pulse of "0" or "1" state. In this case, the digital power receiver of the portable device applies a charging voltage to the battery by rectifying an induction voltage proportional to the variation of the number of interlinked magnetic force lines with respect to time and transmits binary data of a "0" or "1" state by detecting a level of the rectified voltage. Accordingly, binary data, or a voltage of "0" or "1" state is transmitted between the portable device of speech communication and the charger of the base unit by an induction coupling method.

When the portable device generates a binary control pulse of a "0" or "1" state by receiving binary data of a "0" or "1" state from the charger, the induction data voltage generator generates an induction voltage of a magnetic field corresponding to a control pulse. In the charger of the base unit, a data receiver detects and rectifies an induction voltage from the induction data voltage generator of the portable device, and generates binary data of a "0" or "1" state according to a level of the rectified voltage. Accordingly, electrical energy is transmitted from the charger to the portable device and data communication is performed between the two devices in a contactless state when the portable device is placed on the charger of the base unit.

BRIEF DESCRIPTION OF DRAWINGS

For a better understanding of the invention and to show how the same may be carried into effect, reference will now be made, by way of example, to the accompanying diagrammatic drawings, in which:

FIG. 2, 2A and 2B are detailed views of a base unit 12 and a portable device 18 of the contactless digital power transmission and reception system;

DETAILED DESCRIPTION OF A PREFERRED EMBODIMENT

Figure 1:
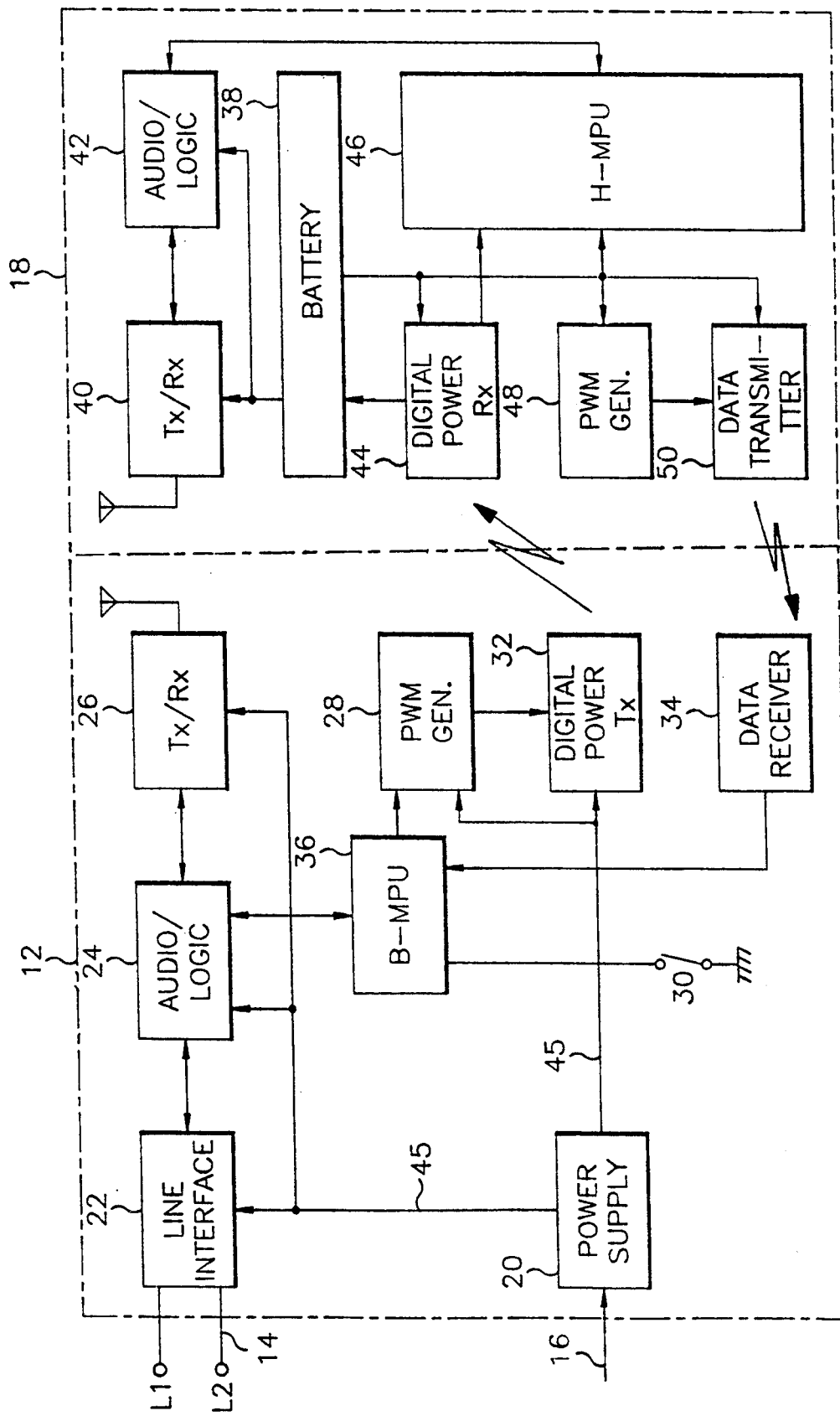
FIG. 1 is a block diagram of a contactless digital power transmission and reception system in a radio telephone according to the present invention.

With reference to FIG. 1, a base unit 12 of a cordless telephone is connected to a telephone line 14 of a wire communication channel and a radio channel is established between the base unit 12 and a portable device (handset) 18 for performing a radio communication.

A principle of operation of one embodiment of the cordless telephone having the base unit 12 and the portable device 18 is similar to an operation of a radio telephone of a mobile communication system utilizing a radio telephone call. In other words, it operates in the same way as that of the radio telephone of a mobile communication system if the portable device 18 has a power supply 20, a pulse width modulation (hereinafter called as "PWM") generator 28, a digital power transmitter 32, a data receiver 34, a base microprocessor 36 (hereinafter called as "B-MPU"), and a charging switch 30, in the case of the portable device 18 being used as a mobile phone of a radio telephone call system.

In FIG. 1, the base unit 12 is connected to a telephone line 14, and a line interface 22 interfaces with the telephone line 14 according to a given control. A base radio transmitter and receiver 26 demodulates a received radio signal of a speech band and modulates a transmitting signal of a speech band for a radio wave transmission. An audio/logic circuit 24 is connected between the line interface. 22 and the base radio transmitter and receiver 26 for interfacing an audio signal and a logic signal. The power supply 20 supplies a power to all circuits of the base unit 12 by regulating a given level voltage (about DC 12-Volt) through a power line 16, and a charging switch 30 generates a charging signal by placement of the portable device 18 on the charger. The PWM pulse generator 28 generates a first PWM pulse of "0" state or a second PWM pulse of "1" state, selectively, according to an input binary signal. A digital power transmitter 32 converts a DC voltage from the power supply 20 into an induction voltage, in response to the first PWM pulse or the second PWM pulse generated selectively from the PWM pulse generator 28. In this case, the induction voltage from the digital power transmitter 32 is an electromagnetic field. A data receiver 34 detects an adjacent induction voltage, rectifies it into a DC voltage and compares a level of the rectified voltage with a predetermined reference voltage to generate a logic signal of a "0" state or a "1" state. The base unit microprocessor 36 transmits the input binary signal to the PWM pulse generator 28, in response to the charging signal from the charging switch 30, and receives the data from the data receiver 34 to control the system.

A configuration of the portable device 18 is illustrated as follows.

A portable radio transmitter and receiver 40 demodulates a received radio wave signal and transmits an input signal of a speech band. An audio/logic circuit 42 reproduces the demodulated received signal of a speech band from the portable radio transmitter and receiver 40, transmits an output speech signal therefrom to the portable radio transmitter and receiver 40, and interfaces a logic signal. A battery 38 supplies an operation voltage to the portable radio transmitter and receiver 40 and the audio/logic circuit 42. A digital power receiver 44 detects and rectifies the induction voltage from the digital power transmitter 32 of the base unit 12 to charge the battery 38, and compares a level of the rectified voltage with a reference voltage to generate a binary signal of "0" or "1" state. A hand-set microprocessor (hereinafter called a "H-MPU") 46 receives the binary signal from the digital power receiver 44 to generate binary data to be transmitted. A PWM pulse generator 48 generates a first PWM pulse of "0" state or a second PWM pulse of "1" state, selectively in response to the binary signal from the H-MPU 46. A data transmitter 50, converts the DC voltage from the battery 38 into an induction voltage, in response to the first PWM pulse or the second PWM pulse generated selectively by the PWM pulse generator 48.

The battery of the portable device 18 is chargeable. The line interface 22, the audio/logic circuit 24, and the base radio transmitter and receiver 26, located in the base unit 12, constitute the voice processing circuits of a radio telephone of general use activated by the power supply 20. Likewise, in the portable device 18, the portable radio transmitter and receiver 40 and the audio/logic circuit 42 constitute the voice processing circuits of a radio telephone of general use.

Only when the portable device is placed on the base unit having a function of charging is it possible for the portable device 18 to charge its battery. By placing the portable device 18 on the base unit 12, the digital power receiver 44 and the data transmitter 50 of the portable device 18 are coupled inductively with the digital power transmitter 32 and the data receiver 34 of the base unit 12, respectively.

With reference to FIG. 1, an operation of the radio telephone is illustrated as follows.

The power supply 20 provides power to every circuit 22–36 of the base unit by regulating the input power through the power line 16. The charging switch 30 is turned on by a pressure force of the portable device 18 when the digital power receiver 44 and the data transmitter 50 of the portable device 18 are placed on the digital power transmitter 32 and the data receiver 34 of the base unit 12.

The B-MPU 36 of the base unit 12 transmits a series of binary data of "0" and "1" states to the PWM generator 28 responding to the charging switch being turned on. The PWM generator 28 generates a first PWM pulse or a second PWM pulse selectively according to the logic of the binary data from the B-MPU 36. For example, the first PWM pulse is transmitted to the digital power transmitter 32 in case of "0" state of the binary data, and the second PWM pulse is transmitted to the digital power transmitter 32 in case of "1" state of the binary data. Assuming that the width of the first PWM pulse and the second PWM pulse are T0 and T1, respectively, an inequality formula is T0 <T1. Accordingly, the PWM generator 28 generates the first and second PWM pulses in serial when the B-MPU 36 generates binary data of the "0" and "1" states alternatively.

The digital power generator 32 converts a DC voltage VDC, transmits through a power supply voltage line 45, into an AC voltage in response to the first and second PWM pulses, and converts the AC voltage into an electromagnetic field to generate an induction voltage. Accordingly, the induction voltage from the digital power transmitter 32 has energy corresponding to the AC voltage, of which an output period is converted by the binary data from the B-MPU 36.

The digital power receiver 44 of the portable device 18 charges the battery 38 by detecting and rectifying the induction voltage of the electromagnetic field output from the digital power transmitter 32 of the base unit 12, and transmits a series of binary data of "0" or "1" state to the H-MPU 46 by detecting a level of the rectified voltage.

Consequently, the digital power transmitter 32 of the base unit 12 transmits the induction voltage according to the binary data of the B-MPU 36, and the digital power receiver 44 of the portable device 18 charges the battery 38 by rectifying the induction voltage and transmits the digital signal of "0" state or "1" state to the H-MPU 46 by detecting the rectified voltage.

The H-MPU 46 transmits binary data of "0" or "1" state to the PWM generator 48 in response to the binary data of "0" or "1" state from the digital power receiver 44. The PWM generator 48 generates a first or second PWM pulse according to a logic of binary data from the H-MPU 46 in the same method as that of the PWM generator 28 of the base unit 12. The data transmitter 50 generates an induction voltage of an electromagnetic field by converting a DC voltage of the battery 38 into an AC voltage corresponding to the first and second PWM pulses of the PWM generator 48. Accordingly, the induction voltage of the data transmitter 50 has energy corresponding to an AC voltage, of which an output period is converted by the binary data from the H-MPU. The induction voltage from the data transmitter 50 is coupled inductively with the data receiver 34. The data receiver 34 of the base unit 12 transmits a digital signal of "0" state or "1" state to the B-MPU 36, according to a level of a rectified voltage obtained by rectifying the induction voltage of the electromagnetic field from the data transmitter 50 of the portable device 18.

Consequently, a data communication is performed between the two units and the battery 38 is charged when the portable device 18 is placed on the base unit 12.

The B-MPU 36 cuts off the induction voltage by sensing an "off" state of the charging switch 30 when the portable device 18 is separated from the base unit 12, and a function of charging the battery and data transmission and reception is interrupted because the operation of the digital power transmitter 32 and the digital power receiver 44 is stopped.

Figure 2A:
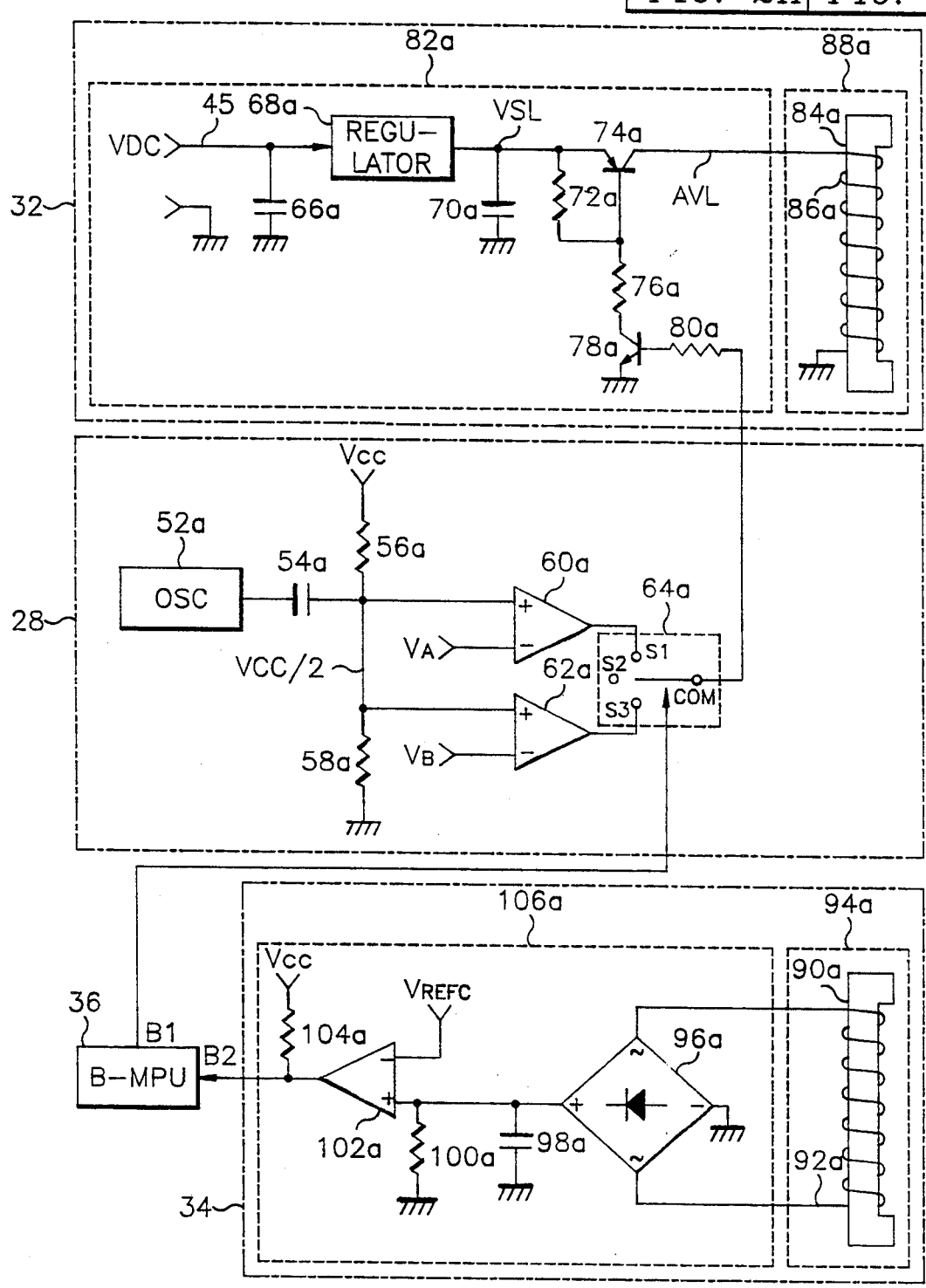
Figure 2B:
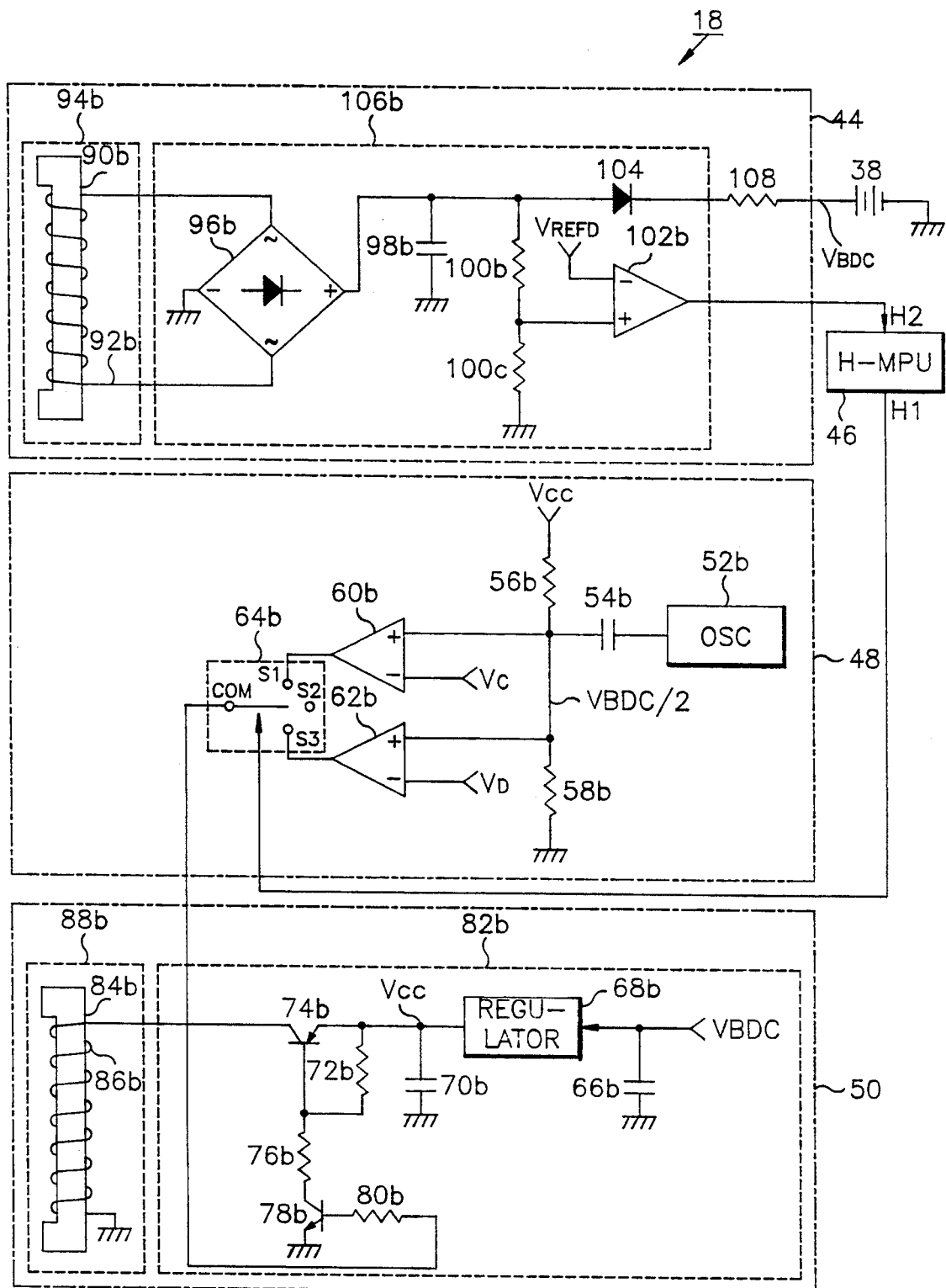

With reference to FIGS. 2A and 2B, there is introduced a more detailed description of the PWM generators 28 and 48, the digital power transmitter 32, the digital power receiver 44, the data transmitter 50, the data receiver 34 and the battery 38.

The PWM pulse generator 28 generates a first or a second PWM pulse of "0" or "1" state, selectively, according to an input control signal. The PWM pulse generator 28 has an oscillator 52a for generating a sine wave signal, resistors 56a, 58a connected between a power supply voltage and around for adding a sine wave signal of the oscillator 52a to a divided voltage level, the divided voltage level accomplished by dividing the power supply voltage, first and second comparators 60a and 62a for generating first and second PWM pulses by comparing the sine wave signal from their non-inverting ends (+) with a first reference voltage VA and a second reference voltage VB, respectively, from their inverting ends (−), and a switch 64a for transmitting the signal from the first and the second comparators 60a and 62a, selectively, according to a logic of an input control signal. The switch 64a selects an end of S2 in the case of a high impedance state, an end of S1 in the case of a low state, and an end of S3 in the case of a high state of the input control signal.

The digital power transmitter 32 of the base unit 12 has a DC-AC inverter 82a for converting a DC voltage, received through a power line 45, into an AC voltage according to the first and second PWM pulses from the PWM pulse generator 28 and an induction voltage generator 88a for generating an induction voltage of an electromagnetic field according to the AC voltage from the DC-AC inverter 82a. In the DC-AC inverter 82a, a regulator 68a transmits a given voltage to a voltage supply line VSL by regulating a power supply voltage VDC, and capacitors 66a, 70a are connected between input and output ends of the regulator 68a for eliminating noise. A first transistor 74a is connected between the voltage supply line VSL and an AC current line AVL and is switched according to an input voltage control signal, and a second transistor 78a is connected between a base of the first transistor 74a and ground for providing the voltage control signal to the first transistor 74a in response to the signal from the PWM pulse generator 28. In this case, any kind of electronic switch having the same function as that of the transistor is also applicable to an element for switching a power supply voltage in response to a control signal. Further, the induction voltage generator 88a for producing an induction voltage of an electromagnetic field corresponding to an AC voltage input has a core 84a and a coil 86a being wound by a given number of turns and connected between the AC voltage line AVL and the ground.

The data receiver 34 has an induction voltage detector 94a for generating an electric signal by detecting an induction voltage of an electromagnetic field, and a data restoring circuit 106a for rectifying the signal from the induction voltage detector 94a and comparing it with a reference voltage of a given level to generate a voltage of "0" state or "1" state, according to a level of the induction voltage. The induction voltage detector 94a of the data receiver 34 has a core 90a and a coil 92a wound by a given number of turns of wire, and is coupled inductively with an induction voltage generator which is installed on the portable device and described later. The data restoring circuit 106a has a rectifier 96a for rectifying the signal from the induction voltage detector 94a and a comparator 102a for comparing the signal from the rectifier 96a with the given reference voltage VREFC to convert the signal from the rectifier 96a into a digital signal.

By placing the portable device 18 on the base unit 12, the digital power receiver 44 detects and rectifies an induction voltage transmitted from the digital power transmitter 32 of the base unit 12, and compares The rectified voltage with a given reference voltage to generate a binary signal of "0" or "1" state. The digital power receiver 44 has an induction voltage detector 94b for coupling inductively with the induction voltage generator 88a. The induction voltage detector 94b has a core 90b and a coil 92b wound by a given number of turns. The data restoring circuit 106b rectifies the voltage from the induction voltage detector 94b, by employing rectifier 9bb to charge the battery 38 and compare the rectified voltage with the given reference voltage VREFD to generate the binary signal of "0" or "1" state. The data restoring circuit 106b has a diode 104 for supplying the signal from the rectifier 96b to the battery 20 in one way, resistors 100b and 100c for dividing the voltage from the rectifier 96b by a given level, and a comparator 102b for comparing the divided voltage with the given reference voltage VREFD to generate the digital signal of "0" state or "1" state.

The PWM pulse generator 48 of the portable device 18 has an oscillator 52b, resistors 56b and 58b, third and fourth comparators 60b and 62b, and a switch 64b, which are connected in the same way as that of the PWM pulse generator 28 of the base unit 12. Inverting ends of the third comparator 60b and fourth comparator 62b receive third and fourth reference voltages VC and VD, equal to the level of the first and second reference voltage VA and VB, respectively, and a switch 64b is switched by a control signal from the H-MPU 46.

The data transmitter 50 has a DC-AC inverter 82b for converting a DC voltage from the battery 38 into an AC voltage according to PWM pulses through the switch 64b and an induction voltage generator 88b for converting the voltage from the DC-AC inverter 82b into an induction voltage. The DC-AC inverter 82b has capacitors 66b and 70b, resistors 72b, 76b and 80b and first and second transistors 74b and 78b, which are connected with one another in the same way as that of the DC-AC inverter 82a of the base unit 12. The induction voltage generator 88b has a core 84b and a coil 86b, which are connected in the same way as that of the induction voltage generator 88a of the base unit 12.

Figure 3A:
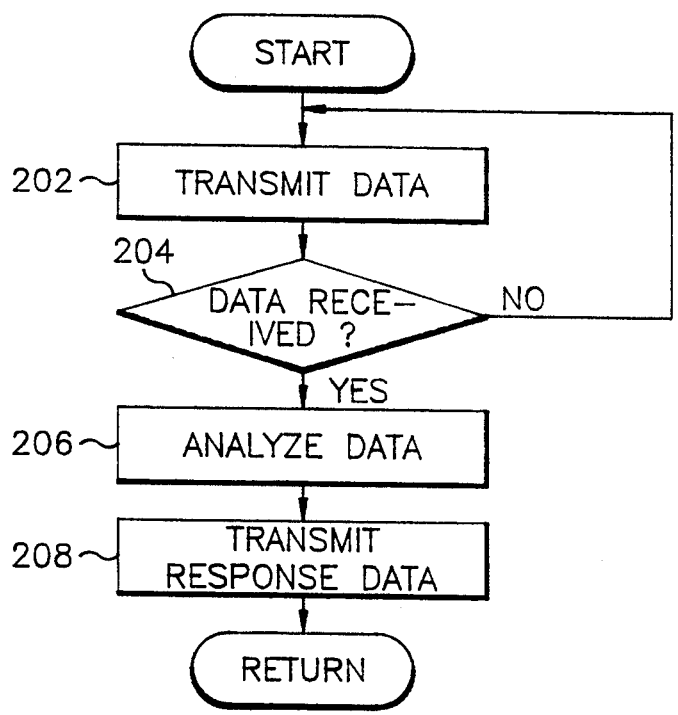
FIGS. 3A and 3B are flow charts for showing the operation of a base unit and a portable device according to one embodiment of this invention.
Figure 3B:
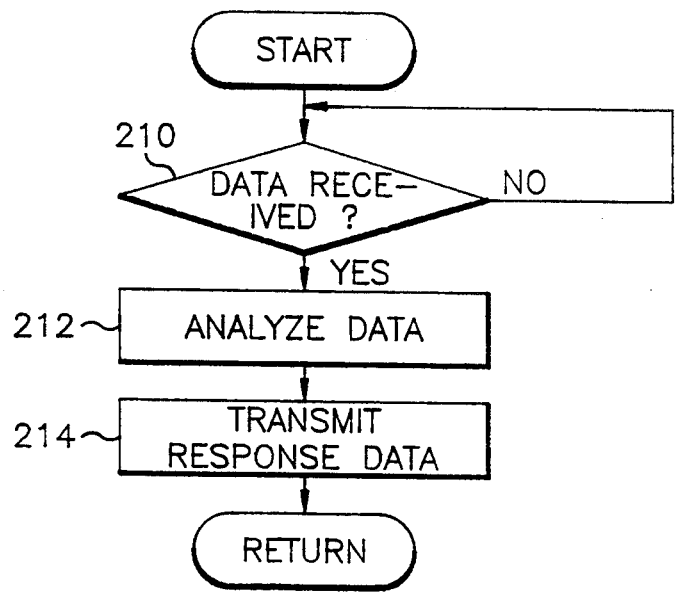

FIG. 3A is a flow chart for showing the operation of the B-MPU 36 in the base unit 12, and FIG. 3B is a flow chart for showing the operation of the H-MPU 46 in the portable device 18.

Figure 4A:
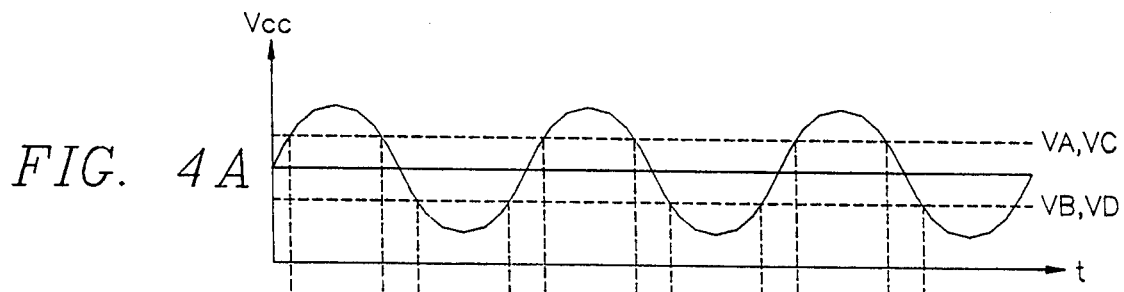
FIGS. 4A, 4B and 4C are a waves diagrams for showing the operation of parts of the contactless digital power transmission and reception system as shown in FIGS. 2A and 2B.
Figure 4B:
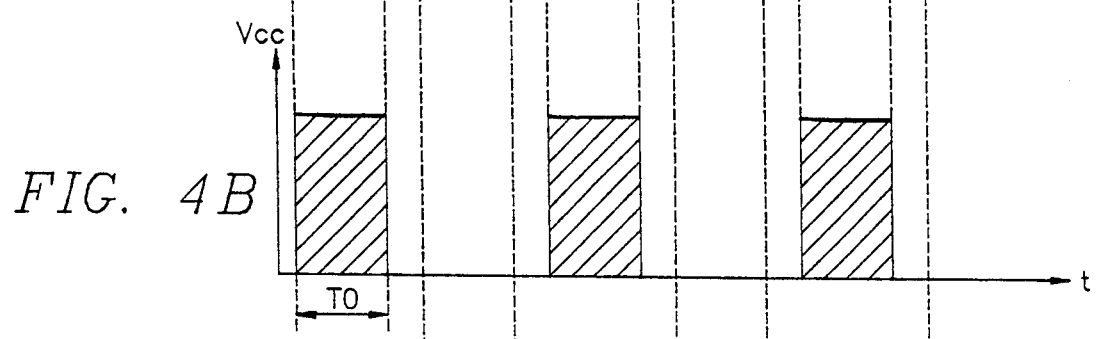
Figure 4C:
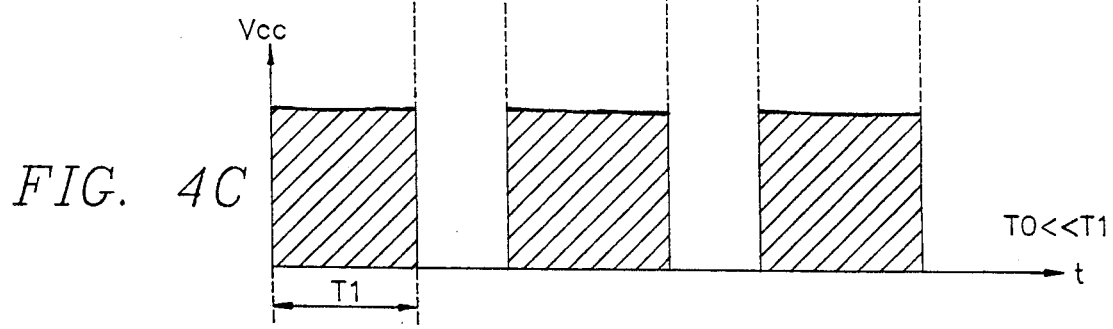

FIG. 4A illustrates an oscillation waveform of the oscillators 52a and 52b of the PWM generators 28 and 48 in FIG. 2, and voltage levels of the first and third reference voltages VA and VC, and the second and fourth reference voltages VB and VD. FIG. 4B illustrates an output waveform from the first and third comparators 60a and 60b which is the first PWM pulse waveform. FIG. 4C illustrates an output waveform from the second and fourth comparators 62a and 62b which is the second PWM pulse waveform.

Assuming that the portable device 18 is separated from the base unit 12, an operation will be described as follows with reference to FIGS. 1, 2, 3A and 3B, and 4A to 4C.

The voltage supply 20 transmits a DC voltage of a given level (about 12-Volts) through the power supply voltage line 16 to all circuits of the base unit 12, and the digital power transmitter 32 receives the power supply voltage through the line 45. The voltage of the line 45 is filtered by the capacitor 66a of the DC-AC inverter 82a to be transmitted to the regulator 68a. The regulator 68a (78 xx series used in this invention) regulates the input DC voltage of 12-Volts to a given voltage level to transmit it to the voltage supply line VSL.

The oscillator 52a of the PWM pulse generator 28 receiving the voltage from the power supply 20, oscillates a sine wave of about 20 KHZ as shown in FIG. 4A to transmit it to the capacitor 54a. The oscillated sine wave signal is added on a DC level of voltage divided by the resistors 56a and 58a to be transmitted to the non-inverting end (+) of the first and second comparators 60a and 62a. The first and second comparators 60a and 62a compare a level of the sine wave signals of the non-inverting ends (+) with the first and second reference voltages VA and VB of the inverting ends (−), respectively. Accordingly, the first comparator 60a transmits the first PWM pulse having a period of T0 through an end S1 of the switch 64a as shown in FIG. 4B. Similarly, the second comparator 62a transmits the second PWM pulse having a period of T1 to an end S3 of the switch 64a.

The B-MPU 36 of the base unit 12 transmits a state of high impedance through an end B1 to the switch 64a when a state of the charging switch 30 is read as "off". The switch 64a switches an end S2 to an end COM to transmit the signal of high impedance state to a base of the transistor 78a. The transistor 78a is turned off by the signal of high impedance state, and the transistor 74a is also turned off because a base of the transistor 74a is connected with a collector of the transistor 78a. Accordingly, the DC voltage of the voltage supply line VSL (hereinafter called as "VSL") is cut off by the transistor 74a when the portable device 18 is separated from the base unit 12. Thus, the induction voltage generator 88a does not produce an induction voltage because of the transistor cutting off the VSL, so that the induction voltage detector 94b of the digital power receiver 44 generates no output (zero volts). Accordingly, the comparator 102b of the data restoring circuit 106b generates an output of a logic "low".

The H-MPU 46 of the portable device 18 checks whether data are received through an input port H2 for a given period, in step 210 of FIG. 3B. When the portable device 18 is separated from the base unit 12, if the H-MPU 46 receives a signal of "low" logic through its input port H2 for a given period, the H-MPU 46 transmits a control signal of high impedance state to the switch 64b of the PWM pulse generator 48.

While all the circuits of the base unit 12 are operated as described above, the PWM pulse generator 48 and the DC-AC inverter 82b of the data transmitter 50 are operated by a power supply voltage VBDC of the battery 38.

In the PWM pulse generator 48, the third and fourth comparators 60b and 62b transmit the first and second PWM pulses of FIGS. 4B and 4C to the ends S1 and S3 of the switch 64b, respectively. The switch 64b transmits a signal of an end S2 selectively according to a high impedance signal from an output port H1 of the H-MPU 46. Accordingly the transistors 78b and 74b are turned off and a charging operation of the battery 38 and a data communication are interrupted when separating the portable device 18 from the base unit 12.

The charging switch 30 is turned off when separating the portable device 18 from the base unit 12, and is turned on when placing the portable device 18 on the base unit 12.

The core 84a of the induction voltage generator 88a of the digital power transmitter 32, and the core 90a of the induction voltage detector 94a of the data receiver 34 are inductively coupled, respectively with the core 84b of the induction voltage generator 88b of the data transmitter 50 and the core 90b of the induction voltage detector 94b of the digital power receiver 44. The digital power transmitter 32 and the data receiver 34 are coupled inductively with the digital power receiver 44 and the data transmitter 50, respectively the same as the primary coil is coupled with the secondary coil in the transformer of general use.

When a user places the portable device 18 on the base unit 12, the charging switch 30 is turned on by a mechanical force and the B-MPU 36 recognizes the state. By recognizing the state of starting the charging, B-MPU 36 transmits regular or irregular binary data of "0" or "1" state through an output end B1, in step 202 of FIG. 3A.

With reference to FIGS. 4B and 4C, the switch 64a transmits the first PWM pulse signal from the first comparator 60a when receiving a binary signal of "0" state and the second PWM pulse signal from the second comparator 62a when receiving a binary signal of "1" state, to a base of the transistor 78a.

The first or second PWM pulse switched by the switch 64a is applied through the resistor 80a to the base of the transistor 78a and so the transistor 78a is turned on or off. A voltage of the collector of the transistor 78a is switched between "low" and "high" according to the first and second PWM pulses period, and the switched voltage signal is applied to a base of the transistor 74a. When the PWM pulse generator 28 generates the first and second PWM pulses in response to the binary data of "0" and "1" states from the B-MPU 36, the collector of the transistor 74a generates an AC voltage in response to the first and second PWM pulses.

The AC voltage from the collector of the transistor 74a is applied through an AC voltage line AVL to the coil 86a being wound around the core 84a of the induction voltage generator 88a. When the AC voltage current flows through the coil 86a, an electromagnetic field is formed around the coil 86a and some of the magnetic force lines are interlinked with the coil 92b being wound around the core 90b of the induction voltage detector 94b of the digital power receiver 44. Because the AC current applied to the coil 86a is changed according to a given time, an AC voltage is induced between two ends of the coil 92b of the induction voltage detector 94b, proportional to variation of the number of interlinked magnetic force lines with respect to time. Namely, the AC voltage of the coil 86a is induced between both ends of the coil 92b of the induction voltage detector 94b on the basis of the principle of an inductive coupling.

The induced AC voltage from the both ends of the coil 92b is applied to both AC voltage ends of a bridge diode 96b, and the bridge diode 96b rectifies the AC voltage by a full wave rectification. The capacitor 98b transmits a ripple voltage by smoothing the DC voltage from the bridge diode 96b, and a level of the rectified voltage is varied according to the first and second PWM pulses. For example, assuming that the voltage rectified from the induction voltage according to the first PWM pulse is V1, the voltage rectified from the induction voltage according to the second PWM pulse is 2V1.

The rectified voltage is transmitted to the voltage divider having resistors 100b and 100C, and limited to a given level by a resistor 108 through a diode 104 to be applied to the battery 38. The resistor 108 limits a current and the diode 104 prevents a reverse current when the rectified voltage is lower than the voltage of the battery 38. The voltage divider divides the rectified voltage by a ratio of the resistors 100b to 100C and transmits the divided voltage to a non-inverting end (+) of the comparator 102b. An inverting end (−) of the comparator 102b is supplied with a reference voltage VRFD of a given level, which is higher than an effective voltage of the first PWM pulse as shown in FIG. 4B and lower than an effective voltage of the second PWM pulse as shown in FIG. 4C. The given reference voltage VRFD is constant and the voltage divided by the resistors 100b and 100C is varied according to a level of the rectified voltage. The comparator 102b transmits a logic "1" when the rectified voltage being higher than the reference voltage and a logic "0" when the rectified voltage, being lower than the reference voltage to the input port H2 of the H-MPU 46.

In this case, the H-MPU 46, repeating the steps for a given period as shown in FIG. 3B, checks a data reception in step 210 and analyzes the received data in step 212, and generates response data responding to the received data through the output port H1 in step 214 and then returns.

Thus, a charging voltage is applied to the battery and data communication is performed by coupling the digital power transmitter 32 with the digital power receiver 44 inductively when the B-MPU 36 transmits data through the output port B1.

When the H-MPU 46 transmits the binary response data according to the received data, in step 214 of FIG. 3B, the switch 64b selects the first or second PWM pulse from the third or fourth comparators 60b and 62b according to the input logic data to transmit it to the base of the transistor 78b. For example, the switch 64b switches the first PWM pulse from the third comparator 60b as shown in FIG. 4B when the data from the H-MPU 46, is the "0" state of binary and switches the second PWM pulse from the fourth comparator 62b as shown in FIG. 4C when the data of the H-MPU 46 is the "1" state of binary to the transistor 78b. The transistor 78b is turned on or off by the first or second PWM pulse transmitted selectively from the switch 64b. Thus, the voltage from the regulator 68b regulating the DC voltage of the battery is converted into an AC voltage since the transistor 74b connected to the collector of the transistor 78b is switched alternatively.

The collector of the transistor 74b generates the AC voltage in response to the first or second PWM pulse. The AC voltage is applied to the coil 86b of the core 84b of the induction voltage generator 88b. When the AC current flows through the coil 86b owing to the AC voltage responding to the first and second PWM pulses, an electromagnetic field is formed around the coil 86b and some of the magnetic force lines are interlinked with the coil 92a of the induction voltage detector 94a in the data receiver 34. Because the AC current of the coil 86b is changed according to a given time, an AC voltage is induced between both ends of the coil 92a, proportional to the variation of the number of interlinked magnetic force lines with respect to time.

Namely, the AC voltage of the coil 86b is induced between both ends of the coil 92a of the induction voltage detector 94a on the basis of a principle of inductive coupling.

The AC voltage from both ends of the coil 92a is transmitted to AC voltage ends of the bridge diode 96a and rectified by way of the full wave rectification. The DC voltage of full wave rectification from the bridge diode 96a is the same one as the DC voltage rectified from the AC voltage generated from the induction voltage generator 88b according to the first and second PWM pulses. Accordingly, the rectified voltage from the induction voltage according to the second PWM pulse is higher than that from the induction voltage according to the first PWM pulse. The rectified voltage is smoothed by the capacitor 98a to be transmitted as a rectified ripple voltage.

The rectified voltage is transmitted through the resistor 100a to a non-inverting end (+) of the comparator 102a. The comparator 102a compares the rectified voltage with the reference voltage VREFC of its inverting end (−) and transmits a logic "high" signal when the rectified voltage is higher than the reference voltage and a logic "low" signal when the rectified voltage is lower than the reference voltage to an input end B2 of the B-MPU 36. The reference voltage VREFC of the data restoring circuit 106a is the same as the reference voltage VREFD of the data restoring circuit 106b of the portable device 18.

The B-MPU 36 recognizes data reception in step 204 of FIG. 3A when receiving data through its input end B2, and analyzes the data in step 206. The B-MPU 36 transmits response data to a control end of the switch 64a in step 208 and then returns. The switch 64a transmits the first and second PWM pulses in response to the data from the B-MPU 36 so that data and an electrical energy are transmitted from the base unit 12 to the portable device 18 in a contactless method. The B-MPU 36 repeats step 202 for charging the battery 38 when receiving no data information after checking whether data is received through the input port B2 as shown in FIG. 3A.

A function of charging a battery and a data communication is started as soon as the portable device 18 is placed on the base unit 12, and the function of charging the battery is stopped as soon as the data communication is started therebetween.

In conclusion, the contactless system prevents the loss of charging function from occurring due to a mechanical contact between the charging ends and extends the life of a battery by the inductive coupling.

While the invention has been particularly shown and described with reference to a preferred embodiment, it will be understood by those skilled in the art that modifications in detail may be made without departing from the spirit and scope of the invention.

What is claimed is:

1. A contactless digital power transmission and reception system in a radio telephone using a battery, comprising:

charging energy generating means for generating an induction voltage of an electromagnetic field in response to an alternating current voltage, said charging energy generating means comprising voltage invertor means for inverting a direct current voltage into the alternating current voltage in response to a pulse signal, and induction voltage generator means connected to said voltage invertor means for generating said induction voltage of said electromagnetic field in response to said alternating current voltage from said voltage invertor means; and portable means inductively connectable with said charging energy generating means, for rectifying the induction voltage of said electromagnetic field, and for supplying the rectified induction voltage to the battery as a charging voltage, said portable means being detachable and removable from said charging energy generating means;

whereby the battery is charged with said induction voltage when said portable means is inductively connected with said charging energy generating means and alternatively, said induction voltage charged into the battery is supplied to said portable means when said portable means is inductively removed from the charging energy generating means.

2. The contactless digital power transmission and reception system in a radio telephone as claimed in claim 1, wherein said portable means comprises:

induction voltage detector means for detecting said induction voltage of said electromagnetic field to generate a pulse voltage; and rectifier means connected to said induction voltage detector means, for rectifying said pulse voltage from said induction energy detector means and supplying the rectified induction voltage to the battery as the charging voltage.

3. A radio telephone having a base unit connected with a telephone line and a portable device for enabling a radio communication between said base unit and said portable device, wherein:

said base unit comprises:

first modulating means for generating one of a first modulated pulse having a first state and a second modulated pulse having a second state in response to a first binary signal;

first control means for transmitting said first binary signal to said first modulating means in response to a first restored binary signal;

digital power transmission means for generating a first alternating current voltage in response to one of said first and second modulated pulses, and for generating a first induction voltage in response to said first alternating current voltage; and data reception means for rectifying a second induction voltage, and for comparing the rectified second induction voltage with a reference voltage to transmit said first restored binary signal to said first control means; and said portable device comprises:

digital power reception means inductively connectable with said digital power transmission means when said portable device is inductively connected with said base unit, for detecting said first induction voltage from said digital power transmission means, rectifying the detected first induction voltage to supply the rectified first induction voltage to the battery as a charging voltage, and comparing the rectified first induction voltage with said reference voltage to generate a second restored binary signal;

second control means for transmitting a second binary signal in response to said second restored binary signal from said digital power reception means;

second modulating means for generating one of a third modulated pulse having said first state and a fourth modulated pulse having said second state in response to said second binary signal; and data transmission means inductively connectable with said data reception means when said portable device is inductively connected with said base unit, for generating a second alternating current voltage in response to one of said third and fourth modulated pulses and generating said second induction voltage in response to said second alternating current voltage;

whereby the battery is charged with said first induction voltage and a data communication is performed between said base unit and said portable device when said portable device is inductively connected with said base unit.

4. The radio telephone as claimed in claim 3, wherein said first modulating means comprises:

first pulse generator means for generating said first modulated pulse;

second pulse generator means for generating said second modulated pulse; and switch means for enabling transmission of one of said first and second modulated pulses in response to said first binary signal.

5. The contactless digital power transmission and reception system in a radio telephone as claimed in claim 3, wherein said second modulating means comprises:

third pulse generator means for generating said third modulated pulse;

fourth pulse generator means for generating said fourth modulated pulse; and switch means for alternately enabling transmission of said third and fourth modulated pulses in response to said second binary signal.

6. A contactless charging and data transmission system comprising a base unit said base unit comprising:

modulating means for generating a modulated signal in response to a control signal;

base power transmission means for converting a first direct current voltage from a power supply to a first induction voltage in response to said modulated signal; and base data reception means for converting a second induction voltage received from a portable device into a second direct current voltage, said base data reception means comprises:

induction voltage detector means for converting said second induction voltage to a second alternating current voltage; and rectifier means for rectifying said second alternating current to generate a rectified signal; and comparator means for making a comparison between said rectified signal and a first reference voltage to generate said second direct current voltage.

7. The contactless charging and data transmission system as claimed in claim 6, wherein said base unit further comprises control means for generating said control signal in response to said second direct current voltage.

8. The contactless charging and data transmission system as claimed in claim 6, wherein said modulating means comprises:

oscillation means for generating an alternating amplitude signal;

voltage divider means for dividing a potential and adding said alternating amplitude signal to said divided potential to generate an intermediate signal;

first comparator means for making a comparison between said intermediate signal and a first reference voltage to generate a first modulated pulse;

second comparator means for making a comparison between said intermediate signal and a second reference voltage to generate a second modulated pulse; and switch means for alternately enabling transmission of said first and second modulated pulses in response to said control signal.

9. The contactless charging and data transmission system as claimed in claim 6, further comprising a portable device containing a battery, said portable device comprising:

portable modulating means for generating a portable modulated signal in response to a portable control signal;

portable power reception means for converting said first induction voltage to a third direct current voltage and a fourth direct current voltage; and portable data transmission means for converting a fifth direct current voltage from the battery to a second induction voltage in response to said portable modulated signal.

10. The contactless charging and data transmission system as claimed in claim 6, wherein said base power transmission means comprises:

voltage inverter means for converting said first direct current voltage to a first alternating current voltage; and induction voltage generation means for converting said first alternating current voltage to said first induction voltage.

11. The contactless charging and data transmission system as claimed in claim 10, wherein said voltage invertor means comprises:

regulation means for attenuating said first direct current voltage to generate an attenuated voltage;

means for eliminating noise from said attenuated voltage; and first switch means for enabling transmission of said attenuated voltage to generate said first alternating current voltage in response to said modulated signal.

12. The contactless charging and data transmission system as claimed in claim 11, wherein said first switch means comprises:

a first transistor having a base connected to receive said modulated signal from to said modulating means; and a second transistor having a base connected to a collector of said first transistor for enabling transmission of said attenuated voltage.

13. The contactless charging and data transmission system as claimed in claim 12, wherein said modulating means comprises:

oscillation means for generating an alternating amplitude signal;

voltage divider means for dividing a potential and adding said alternating amplitude signal to said divided potential to generate an intermediate signal;

first comparator means for making a comparison between said intermediate signal and a first reference voltage to generate a first modulated pulse;

second comparator means for making a comparison between said intermediate signal and a second reference voltage to generate a second modulated pulse; and second switch means for alternately enabling transmission of said first and second modulated pulses in response to said control signal.

14. The contactless charging and data transmission system as claimed in claim 13, wherein said base unit further comprises:

charging switch means for opening and closing in response to pressure from the portable base means; and control means for generating said control signal in response to a condition of said charging switch means and said second direct current voltage;

said second switch means not enabling transmission of said first and second modulated pulses in response to said control signal when the portable base means is not placed on the base means.

15. A contactless charging and data transmission system comprising a portable device containing a battery, said portable device comprising:

modulating means for generating a modulated signal in response to a control signal;

portable power reception means for converting a first induction voltage received from an external source physically separated from said power reception means into a first direct current voltage and a second direct current voltage, said portable power reception means comprising:

induction voltage detector means for converting said first induction voltage to a first alternating current voltage;

rectifier means for rectifying said first alternating current to generate a rectified signal;

voltage divider means for dividing a voltage of said rectified signal to generate a divided rectified signal;

first comparator means for making a comparison between said divided rectified signal and a first reference voltage to generate said second direct current voltage;

transfer means for transferring said rectified signal to the battery, and for preventing a reverse current from the battery to said rectifier means; and portable data transmission means for converting a third direct current voltage from the battery to a second induction voltage in response to said modulated signal.

16. The contactless charging and data transmission system as claimed in claim 15, wherein said portable device further comprises control means for generating said control signal in response into said second direct current voltage.

17. The contactless charging and data transmission system as claimed in claim 15, wherein said modulating means comprises:

oscillation means for generating an alternating amplitude signal;

voltage divider means for dividing a potential and adding said alternating amplitude signal to said divided potential to generate an intermediate signal;

first comparator means for making a comparison between said intermediate signal and a first reference voltage to generate a first modulated pulse;

second comparator means for making a comparison between said intermediate signal and a second reference voltage to generate a second modulated pulse; and switch means for alternately enabling transmission of said first and second modulated pulses in response to said control signal.

18. The contactless charging and data transmission system as claimed in claim 15, wherein said portable data transmission means comprises:

voltage inverter means for converting said third direct current voltage to a second alternating current voltage; and induction voltage generation means for converting said second alternating current voltage to said second induction voltage.

19. The contactless charging and data transmission system as claimed in claim 18, wherein said voltage inverter means comprises:

regulation means for attenuating said third direct current voltage to generate an attenuated voltage; and first switch means for alternately enabling transmission of said attenuated voltage to generate said first alternating current voltage in response to said modulated signal.

20. The contactless charging and data transmission system as claimed in claim 19, wherein said first switch means comprises:

a first transistor having a base connected to receive said modulated signal from said modulating means; and a second transistor having a base connected to a collector of said first transistor for alternately enabling transmission of said attenuated voltage.

21. The contactless charging and data transmission system as claimed in claim 20, wherein said modulating means comprises:

oscillation means for generating an alternating amplitude signal;

voltage divider means for dividing a potential and adding said alternating amplitude signal to said divided potential to generate an intermediate signal;

second comparator means for making a comparison between said intermediate signal and a second reference voltage to generate a first modulated pulse;

third comparator means for making a comparison between said intermediate signal and a third reference voltage to generate a second modulated pulse; and second switch means for alternately enabling transmission of said first and second modulated pulses in response to said control signal.

22. The contactless charging and data transmission system as claimed in claim 21, wherein said portable device further comprises:

control means for generating a high impedance signal when the portable device is not place on the base means, and a control signal in response to said second direct current voltage; and said second switch means not enabling transmission of said first and second modulated pulses in response to said high impedance signal.

23. A method for charging a battery in an electronic device having a base means with a power supply connectable to a power source and a portable base means containing the battery, said method comprising:
- converting a first direct current voltage from the power supply to a first induction voltage in response to a first control signal;
- converting said first induction voltage to a second direct current voltage and a third direct current voltage;
- supplying said second direct current voltage to the battery;
- converting said third direct current voltage to a second control signal; and
- generating a second induction voltage in response to said second control signal; and
- converting said second induction voltage to said first control signal.

24. The method as claimed in claim 23, wherein said step of converting said first direct current voltage to a first induction voltage comprises:
- attenuating said first direct current voltage to generate an attenuated voltage;
- converting said attenuated voltage to a first alternating current voltage; and
- converting said first alternating current voltage to said first induction voltage.

25. The method as claimed in claim 24, wherein said step converting said third direct current voltage comprises the steps of:
- generating a sinusoidal signal;
- adding said sinusoidal signal to a fourth direct current voltage to generate an intermediate signal;
- making a first and second comparison between said intermediate signal and a first and second reference voltage, respectively; and
- alternately transmitting said second control signal in response to said first and second comparison.

26. The method as claimed in claim 25, wherein said step of generating said second induction voltage in response to said second control signal comprises:
- attenuating a battery voltage from the battery to generate a attenuated battery voltage;
- converting said attenuated battery voltage to a second alternating current voltage; and
- converting said second alternating current voltage to said second induction voltage.

27. A contactless digital power transmission and reception system in a radio telephone comprising a base unit electrically connected to telephone lines and a power terminal, and a cordless portable device detachable from the base unit and operable by a battery, said base unit comprising:
- power transmission means for generating first induction voltages of a first electromagnetic field representative of transmission power; and
- data reception means for detecting second induction voltages of a second electromagnetic field, and providing the detected second induction voltages as communication data; and said cordless portable device comprising:
- power reception means inductively connectable with said power transmission means of said base unit when said cordless portable device is inductively connected with said base unit, for detecting the first induction voltages of said first electromagnetic field from said power transmission means, and supplying the detected first induction voltages to the battery as charging voltages; and
- data transmission means inductively connectable with said data reception means of said base unit when said cordless portable device is inductively connected with said base unit, for transmitting the second induction voltages of said second electromagnetic field to said data reception means;
- whereby the battery is charged with the first induction voltages and data communication is achieved between said base unit and said cordless portable device when said cordless portable device is inductively connected with said base unit.

28. The contactless digital power transmission and reception system as claimed in claim 27, wherein said power transmission means of said base unit comprises:
- voltage convertor means for converting direct-current voltages into alternating-current voltages in response to modulated pulses; and
- induction voltage generator means for generating said first induction voltages in response to said alternating-current voltages.

29. The contactless digital power transmission and reception system as claimed in claim 28, wherein said power reception means of said cordless portable device comprises:
- induction voltage detector means inductively connectable with said power transmission means when said cordless portable device is inductively connected with said base unit, for detecting the alternating-current voltages; and
- data restoring means for rectifying the alternating-current voltages and comparing the rectified first induction voltages with reference voltages to supply the detected first induction voltages to the battery as charging voltages.

30. The contactless digital power transmission and reception system as claimed in claim 27, wherein said data transmission means of said cordless portable device comprises:
- voltage convertor means for converting direct-current voltages into alternating-current voltages in response to modulated pulses; and
- induction voltage generator means for generating said second induction voltages in response to said alternating-current voltages.

31. The contactless digital power transmission and reception system as claimed in claim 30, wherein said data reception means of said base unit comprises:
- induction voltage detector means inductively connectable with said data transmission means when said cordless portable device is inductively connected with said base unit, for detecting the alternating-current voltages; and
- data restoring means for rectifying the alternating-current voltages from said induction voltage detector means and comparing the rectified induction voltages with reference voltages to provide said communication data.

32. A contactless digital power transmission and reception system in a radio telephone using a battery, comprising:
a base unit comprising:
- first modulating means for generating one of a first modulated pulse and a second modulated pulse in response to a first binary signal;
- digital power transmission means connected to said first modulating means, for generating a first induction voltage of a first electromagnetic field in response to one of said first and second modulated pulses; and data reception means for detecting and rectifying a second induction voltage of a second electromagnetic field, comparing the rectified second induction voltage with a reference voltage to restore the rectified second induction voltage into said first binary signal and transmitting said first binary signal to said modulating means; and a portable device comprising:

digital power reception means inductively connectable with said digital power transmission means when said portable device is inductively connected with said base unit, for detecting said first induction voltage from said digital power transmission means, rectifying said first induction voltage to supply the rectified induction voltage to the battery as a charging voltage, and comparing the rectified induction voltage with said reference voltage to generate a second binary signal;

second modulating means connected to said digital power reception means, for generating one of a third modulated pulse and a fourth modulated pulse in response to said second binary signal; and data transmission means inductively connectable with said data reception means when said portable device is inductively connected with said base unit, for transmitting said second induction voltage of said second electromagnetic field to said data reception means in response to one of said third and fourth modulated pulses, said first induction voltage charging the battery and data communication between said base unit and said portable device being enabled while said portable device is inductively connected with said base unit.

33. The contactless digital power transmission and reception system in a radio telephone as claimed in claim 32, wherein said reference voltage is higher than an effective voltage of said first modulated pulse and lower than an effective voltage of said second modulated pulse.

34. The contactless digital power transmission and reception system in a radio telephone as claimed in claim 32, wherein said digital power transmission means comprises:

voltage invertor means for converting a first direct current voltage into a first alternating current voltage by switching in response to one of said first and second modulated pulses; and first induction voltage generator means for generating said first induction voltage in response to said first alternating current voltage from said voltage invertor means.

35. The contactless digital power transmission and reception system in a radio telephone as claimed in claim 34, wherein said first induction voltage generator means comprises a first core and a first coil wound around said first core to generate a plurality of magnetic force lines of said first electromagnetic field in response to said first alternating current voltage.

36. The contactless digital power transmission and reception system in a radio telephone as claimed in claim 32, wherein said digital power reception means comprises:

first induction voltage detector means inductively connectable with said digital power transmission means when said portable device is inductively connected with said base unit, for detecting a first alternating current voltage of said first induction voltage; and first data restoring means for rectifying said first alternating current voltage from said first induction voltage detector means and comparing the rectified first induction voltage with said reference voltage to generate said second binary signal.

37. The contactless digital power transmission and reception system in a radio telephone as claimed in claim 36, wherein said first induction voltage detector means comprises a first core and a first coil wound around said first core to generate said first alternating current voltage proportional to a variation of the number of interlinked magnetic force lines of said first electromagnetic field with respect to time.

38. The contactless digital power transmission and reception system in a radio telephone as claimed in claim 36, wherein said reference voltage is higher than an effective voltage of said first modulated pulse and lower than an effective voltage of said second modulated pulse.

39. The contactless digital power transmission and reception system in a radio telephone as claimed in claim 32, wherein said data transmission means comprises:

second voltage invertor means for converting a second direct current voltage into second alternating current voltage, turning on and off in response to said third and fourth modulated pulses; and second induction voltage generator means for generating said second induction voltage in response to said second alternating current voltage.

40. The contactless digital power transmission and reception system in a radio telephone as claimed in claim 39, wherein said second induction voltage generator means comprises a second core and a second coil wound around said second core to generate a plurality of magnetic force lines of said second electromagnetic field in response to said second alternating current voltage.

41. The contactless digital power transmission and reception system in a radio telephone as claimed in claim 32, wherein said data reception means comprises:

second induction voltage detector means inductively connectable with said data transmission means when said portable device is inductively connected with said base unit, for detecting a second alternating current voltage of said second induction voltage; and second data restoring means for rectifying said second alternating current voltage from said second induction voltage detector means and comparing said rectified second induction voltage with said reference voltage to generate said first binary signal.

42. The contactless digital power transmission and reception system in a radio telephone as claimed in claim 41, wherein said reference voltage is higher than an effective voltage of said first modulated pulse and lower than an effective voltage of said second modulated pulse.

43. The contactless digital power transmission and reception system in a radio telephone as claimed in claim 41, wherein said second induction voltage detector means comprises a second core and a second coil wound around said second core to generate said second alternating current voltage proportional to a variation of the number of interlinked magnetic force lines of said second electromagnetic field with respect to time.

* * * * *